(12) United States Patent
Koch, Jr.

(10) Patent No.: US 6,957,518 B1
(45) Date of Patent: Oct. 25, 2005

(54) TWO-PLATE SPLICE CONNECTION ASSEMBLY

(75) Inventor: Dan A. Koch, Jr., Omaha, NE (US)

(73) Assignee: Valmont Industries, Inc., Valley, NE (US)

( * ) Notice: Subject to any disclaimer, the term of this patent is extended or adjusted under 35 U.S.C. 154(b) by 280 days.

(21) Appl. No.: 10/463,155

(22) Filed: Jun. 17, 2003

(51) Int. Cl.⁷ .............................................. E04C 3/30

(52) U.S. Cl. ..................... 52/726.1; 403/262; 403/312; 248/300

(58) Field of Search ........................... 52/726.1, 726.3, 52/726.4; 403/110, 188, 262, 312; 248/200, 248/300

(56) References Cited

U.S. PATENT DOCUMENTS

| | | | | |
|---|---|---|---|---|
| 4,097,165 A | * | 6/1978 | Quayle | 403/286 |
| 5,599,131 A | * | 2/1997 | Julen et al. | 403/312 |
| 5,941,654 A | * | 8/1999 | Chauquet | 403/384 |
| 6,345,925 B1 | * | 2/2002 | Coleman | 403/24 |

* cited by examiner

Primary Examiner—Carl D. Friedman
Assistant Examiner—Tiara Robertson
(74) Attorney, Agent, or Firm—Thomte, Mazour & Niebergall; Dennis L. Thomte

(57) ABSTRACT

A two-plate splice connection assembly for connecting the lower end of an upper tubular pole member to the upper end of a lower tubular member which eliminates the need for having an individual positioned on the outside of the tubular pole member and an individual positioned on the inside of the tubular pole member when the splice plates are secured together.

15 Claims, 13 Drawing Sheets

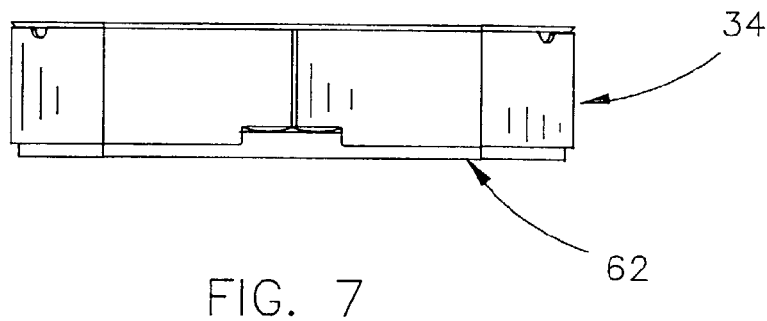
FIG. 7
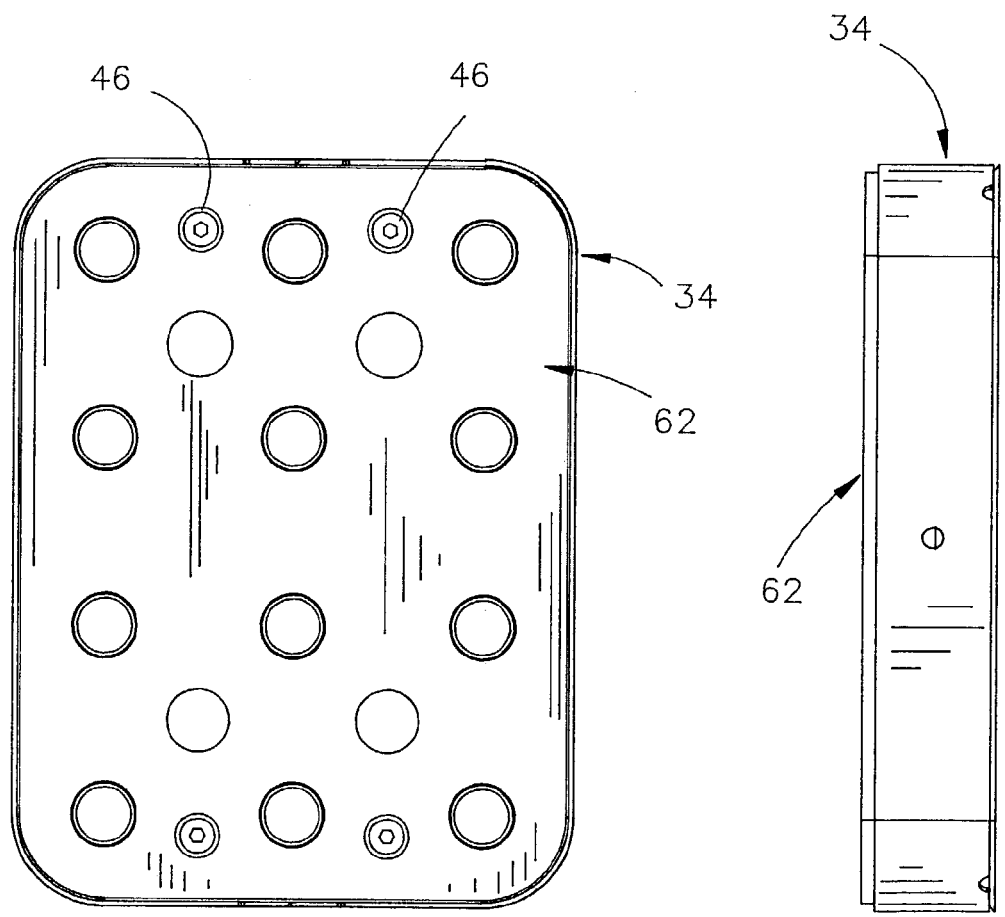
FIG. 8
FIG. 9

TWO-PLATE SPLICE CONNECTION ASSEMBLY

BACKGROUND OF THE INVENTION

1. Field of the Invention

This invention relates to a two-plate splice connection assembly and more particularly to a two-plate splice connection assembly for connecting the lower end of an upper tubular pole member to the upper end of a lower tubular pole member. This invention also relates to a two-plate splice connection assembly for connecting the lower end of a hollow rail secured to an upper tubular pole member to the upper end of a hollow rail secured to a lower tubular pole member.

2. Description of the Related Art

Two-plate splice connection assemblies have been previously utilized for connecting the ends of tubular pole members together as well as for connecting the ends of other structural members together. FIG. 1 illustrates a conventional two-plate splice connection assembly used in the prior art and which is generally referred to by the reference numeral 10. A plurality of the assemblies 10 have been used for connecting the lower end of an upper pole 14 to the upper end of a lower pole 12. Splice plates 16 and 18 are positioned on opposite sides of the shaft walls and have a plurality of bolts 20 extending through bolt openings 22 in splice plate 16, through bolt openings 24 and 26 formed in poles 12 and 14, respectively, through openings 28 in splice plate 18 and which are maintained therein by nuts 30. Although the connection assembly 10 of the prior art works well, the fact that the nuts 30 are on one side of the shaft wall and the heads of the bolts are on the other side of the shaft wall, it is impossible to hold the nuts 30 against rotation during the tightening of the bolts 20 without having an individual on both the inside and outside of the pole. Further, if the nuts 30 become loose on the bolts 20 during the life of the pole, it is again necessary to utilize a person on the outside of the pole and a person on the inside of the pole to tighten the nuts.

SUMMARY OF THE INVENTION

A two-plate splice connection assembly is provided for connecting the lower end of an upper tubular pole member to the upper end of a lower tubular pole member without the need for two persons being required to perform the connection. Normally, a plurality of the two-plate splice connection assemblies will be used between the upper and lower poles. Each assembly comprises a cover plate which is positioned on the outside surface of the pole members. The cover plate includes an interior compartment which faces the pole member. A keeper plate is positioned within the interior compartment of the cover plate inwardly of the outer end thereof. A nut plate is positioned within the interior compartment of the cover plate inwardly of the keeper plate and has a plurality of spaced-apart lower nut openings formed therein and a plurality of spaced-apart upper nut openings formed thereon, each of which have nuts received therein. The nut openings are sized to prevent the nuts therein from rotating with respect to the nut plate.

A first splice plate is mounted on the inner end of the cover plate and is secured thereto by screws or the like. The first splice plate has a plurality of spaced-apart lower bolt openings formed therein which are aligned with the lower nut openings in the nut plate and a plurality of spaced-apart upper bolt openings formed therein which are aligned with the upper nut openings in the nut plate. A first splice plate is positioned adjacent the outer surface of the lower pole member so that the lower bolt openings in the first splice plate are aligned with bolt openings formed in the upper end of the lower pole member. A second splice plate is positioned in the interior of the lower pole member adjacent the inner surface thereof and has a plurality of spaced-apart lower bolt openings formed therein which are aligned with the lower bolt openings in the first splice plate. The second splice plate also has a plurality of spaced-apart upper bolt openings formed therein which are aligned with the upper bolt openings in the first splice plate. A plurality of lower bolts extend through the lower bolt openings in the second splice plate, through bolt openings in the lower pole member with the bolts being threadably connected to the lower nuts in the nut plate. A plurality of upper bolts extend through the upper bolt openings in the second splice plate through bolt openings in the lower end of the upper pole member with the bolts being threadably connected to the upper nuts in the nut plate. The keeper plate, by being positioned between the nut plate and the cover plate, prevents the nuts in the nut plate from moving outwardly from their position in the nut plate. Rotation of the bolts from within the pole causes the splice plates to connect the upper and lower pole members without the need of a person holding the nuts since the nuts are prevented from rotating by the nut plate.

A modified form of the two-plate splice connection assembly is also disclosed for use in those installations wherein the poles have a pair of hollow rails secured to the outer surface thereof such as illustrated in assignee's U.S. Pat. No. 6,505,785. The modified form of the two-plate splice connection is essentially the same as the embodiment described hereinabove except that a cover plate is not required due to the fact that the portion of the assembly which is positioned on the outer surface of the poles is concealed within the interiors of the rails.

A principal object of the invention is to provide an improved two-plate splice connection assembly.

A further object of the invention is to provide a two-plate splice connection assembly for connecting the lower end of an upper pole member to the upper end of a lower tubular member.

Yet another object of the invention is to provide a two-plate splice connection assembly for connecting the lower end of an upper tubular member to the upper end of a lower tubular pole wherein only a single person is required to perform the connection.

A further object of the invention is to provide a two-plate splice connection assembly which does not detract from the aesthetics of the pole.

Yet another object of the invention is to provide a two-plate splice connection assembly for connecting a pair of poles together which is convenient to use.

Still another object of the invention is to provide a two-plate splice connection assembly for connecting a pair of hollow rails mounted on upper and lower tubular pole members.

These and other objects will be apparent to those skilled in the art.

BRIEF DESCRIPTION OF THE DRAWINGS

FIG. 7 is a top view of the cover of FIG. 6;

FIG. 8 is a side view of the cover of FIG. 6;

FIG. 9 is a side view of the cover of FIG. 6;

DESCRIPTION OF THE PREFERRED EMBODIMENT

Figure 1:
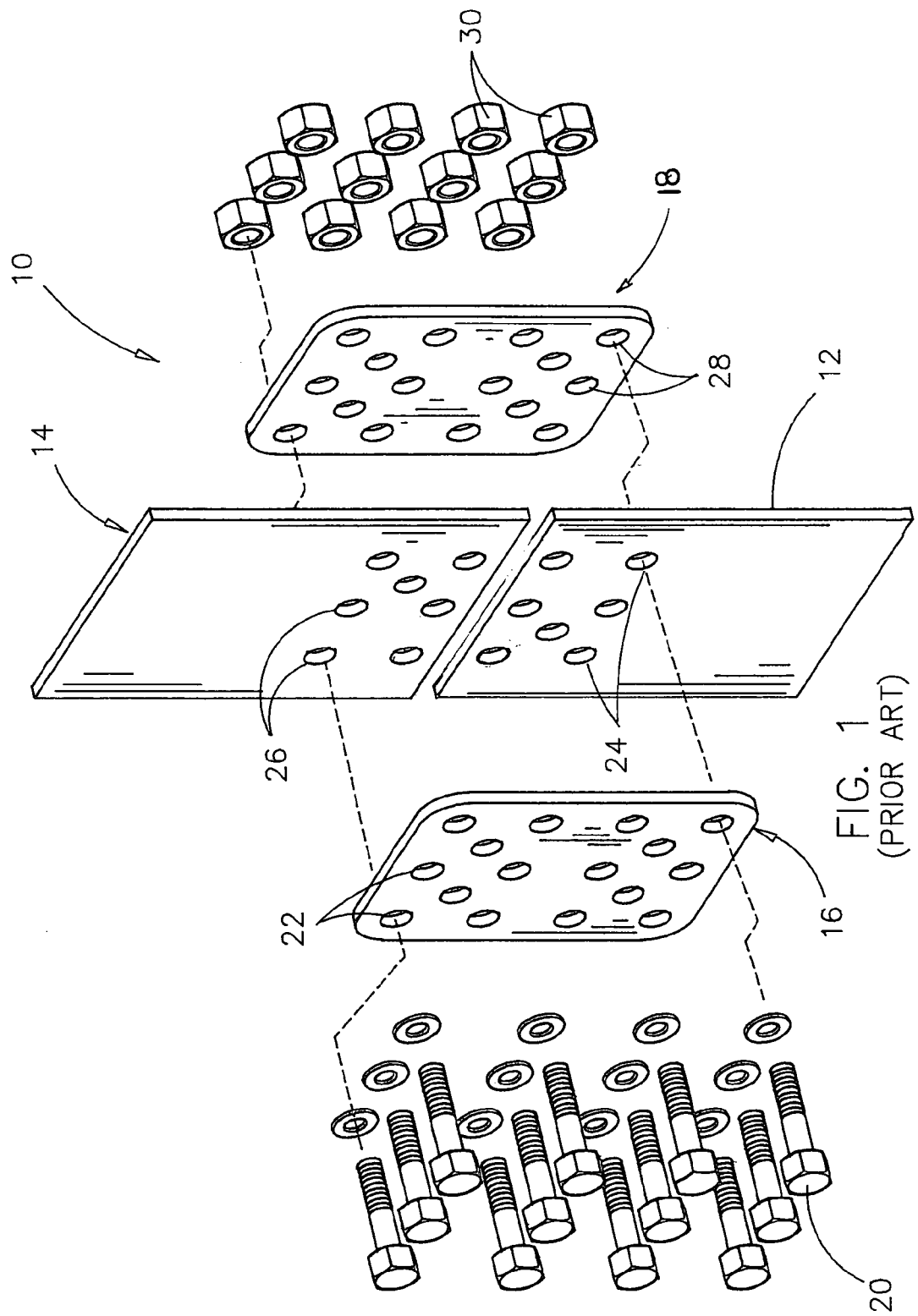
FIG. 1 is a partial exploded perspective view of a prior art two-plate splice connection.

As stated and described hereinabove, the traditional two-plate splice connection assembly of the prior art is illustrated in FIG. 1 with that assembly requiring the use of a person inside the pole and a person outside the pole to tighten the nuts on the bolts of the assembly. In FIG. 1, the numeral 12 refers to a lower tubular pole member which is partially shown while the numeral 14 refers to an upper tubular member which is also partially shown. The numerals 16 and 18 refer to splice plates which are positioned on opposite sides of the shaft walls of the upper and lower pole members. A plurality of bolts 20 extend through openings 22 in splice plate 16, through openings 24 and 26 in pole members 12 and 14, through openings 28 in splice plate 18 and have nuts 30 threadably secured to the outer end thereof. Although the splice connection of FIG. 1 does satisfactorily secure the upper and lower pole members together, the connection of the splice plates to the pole members requires a person on the inside of the pole and a person on the outside of the pole as just described.

Figure 5:
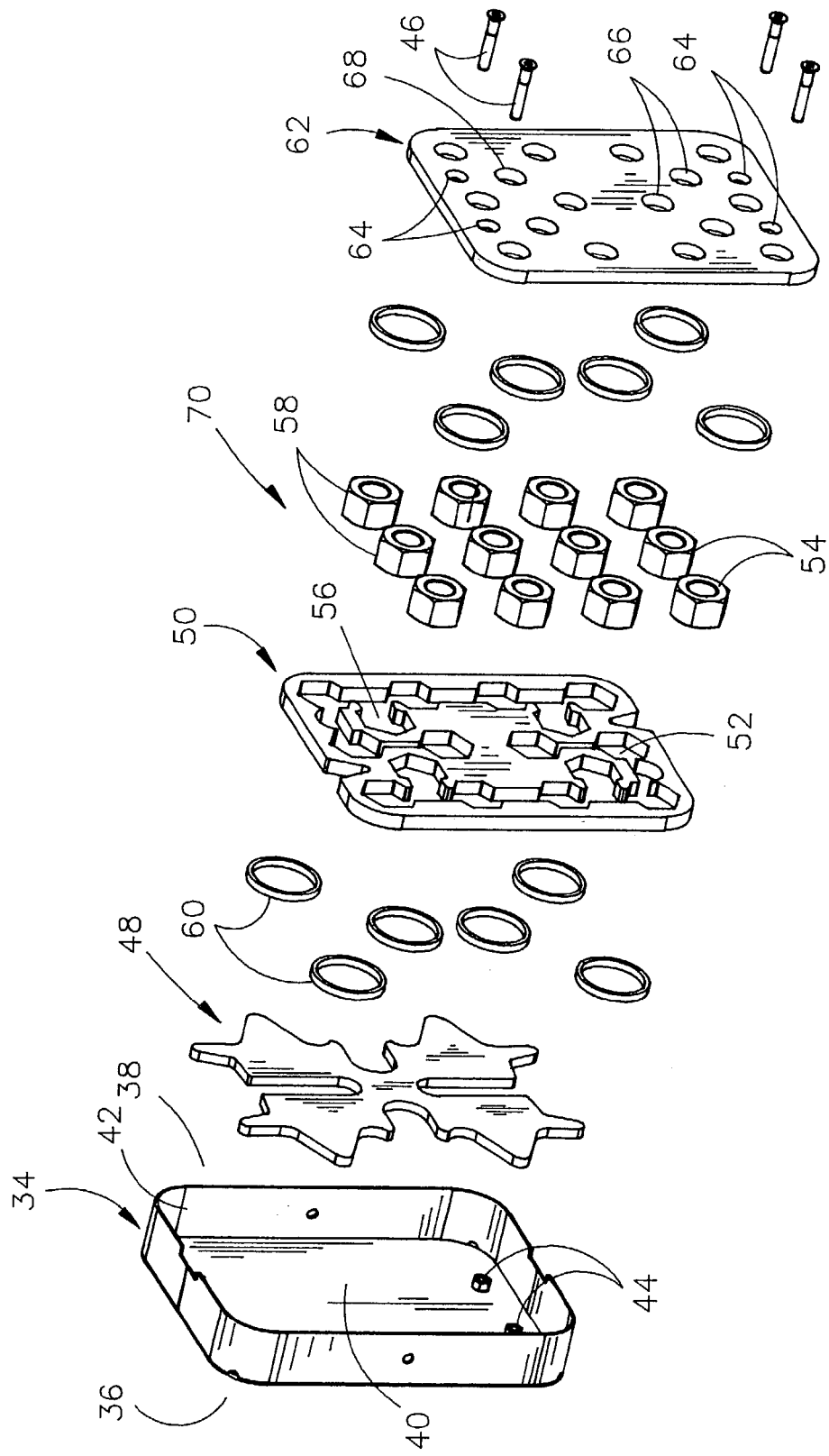
FIG. 5 is a partial exploded perspective view of the cover plate and associated components of one form of the two-plate splice connection assembly of this invention.
Figure 6:
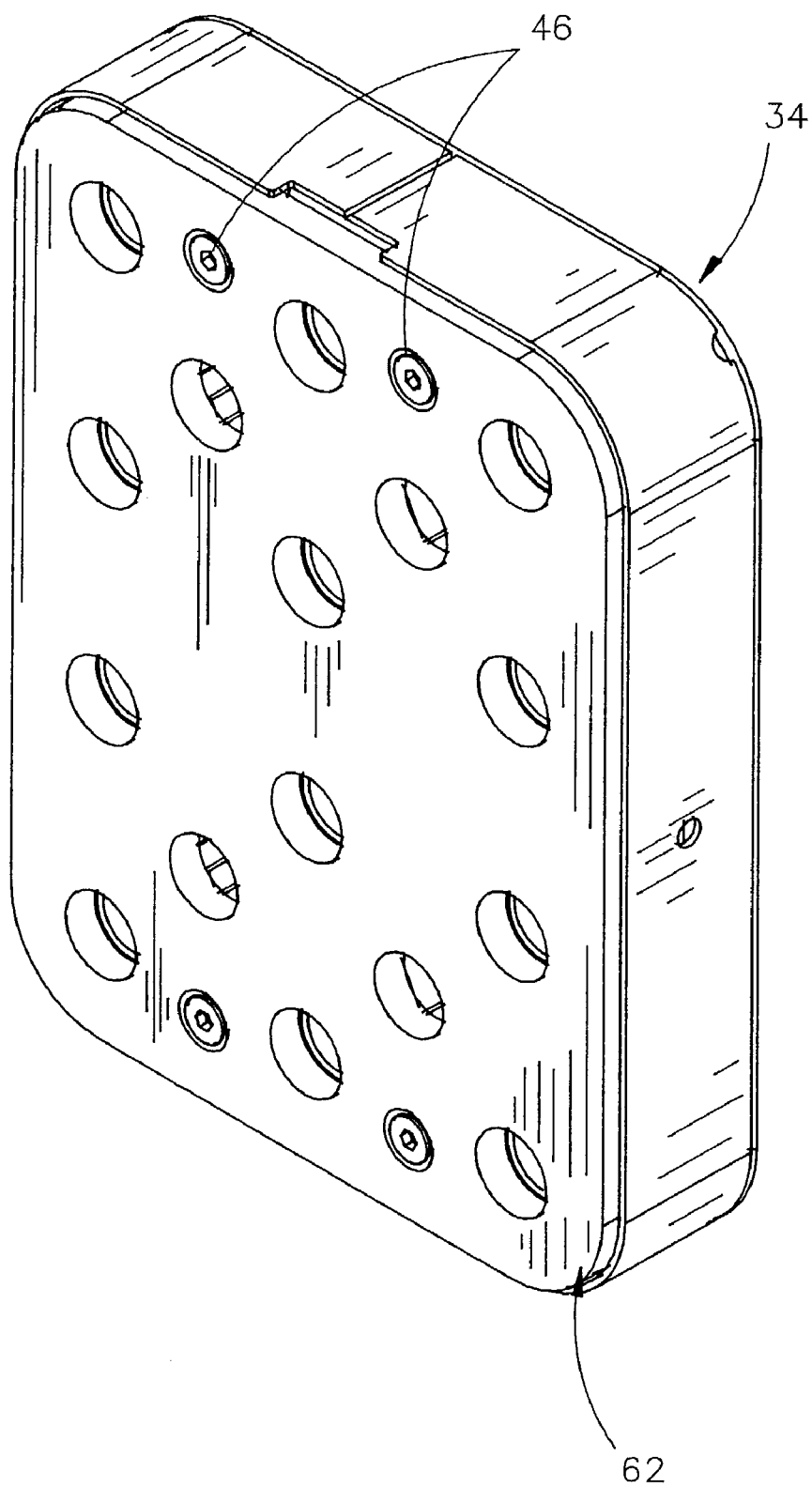
FIG. 6 is a perspective view of the cover plate of the first embodiment of this invention.
Figure 10:
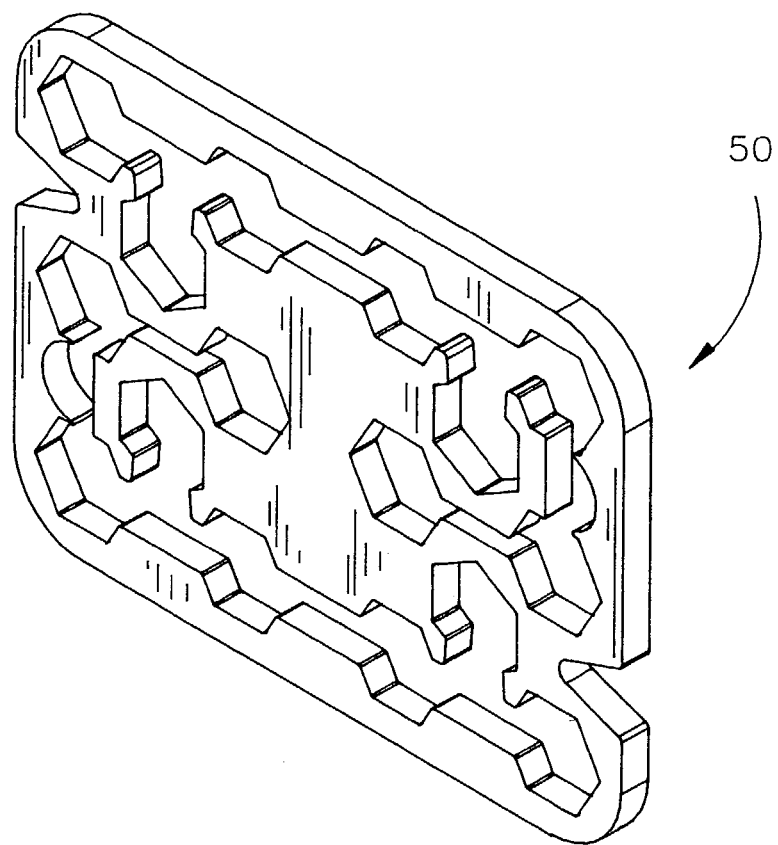
FIG. 10 is a perspective view of the nut plate which is positioned in the cover of FIG. 6.
Figure 11:
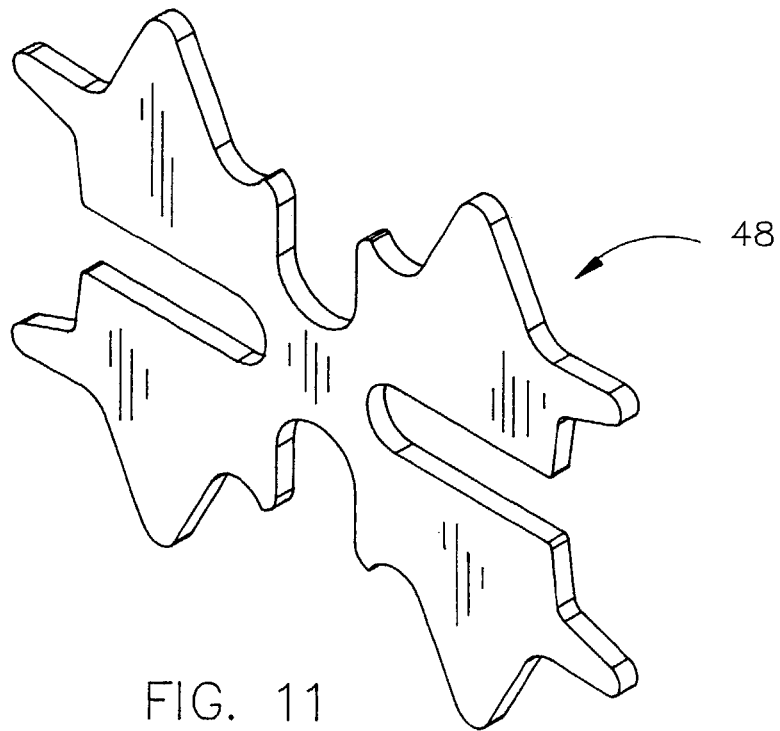
FIG. 11 is a perspective view of the keeper plate which is positioned within the cover of FIG. 6.
Figure 13:
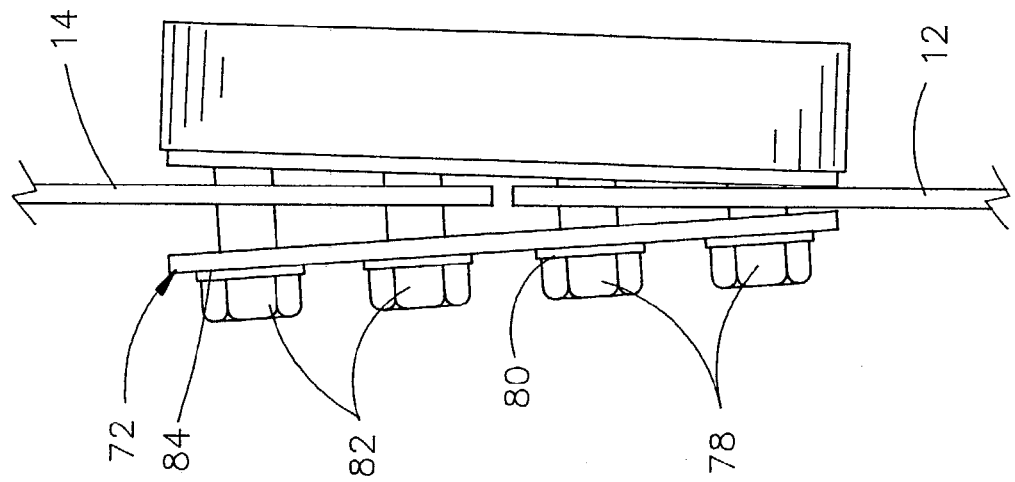
FIG. 13 is a side view of the structure of FIG. 12.

The instant invention enables a pair of pole members 12 and 14 to be spliced together through the use of a plurality of two-plate splice connection assemblies, each of which is generally referred to by the reference numeral 32. Assembly 32 includes a cover plate 34 having an outer end 36 and an inner end 38. As seen in FIG. 5, cover plate 34 is generally cup-shaped and includes a substantially vertically disposed outer wall 40 having an inwardly extending wall portion 42 secured thereto. Preferably, the inner surface of wall 40 is provided with a plurality of nuts 44 secured thereto which are adapted to receive cap screws 46 therein, as will be described hereinafter.

The numeral 48 refers to a keeper plate which is positioned in the interior surface of the cover plate adjacent the inner surface of wall 40. The numeral 50 refers to a nut plate having a plurality of lower nut openings 52 formed therein which are shaped and sized so as to receive the lower nuts 54 therein. Nut plate 50 is also provided with a plurality of upper nut openings 56 which are sized and shaped to receive the upper nuts 58 therein. The size of the openings 52 and 56 is such that the dimensions thereof are slightly greater than the dimensions of the nuts 54 and 58 so that the nuts may slightly float in the nut openings to assist in the alignment process. The openings 52 and 56 are sized to prevent the rotation of the nuts 54 and 58 therein, respectively.

Ring-shaped spacers 60 are positioned between the keeper plate 48 and the nut plate 50. Splice plate 62 is secured to cover plate 34 by means of the cap screws 46 extending through openings 64 formed therein and being threadably received in the nuts 44. Splice plate 62 is provided with a plurality of lower bolt openings 66 formed therein and a plurality of upper bolt openings 68 formed therein. For purposes of description, those components of assembly 34 which are mounted at the exterior surface of the pole members will be referred to as generally comprising a splice plate assembly 70.

The numeral 72 refers to a splice plate which is positioned adjacent the inner surfaces of the poles 12 and 14. Splice plate 72 includes a plurality of lower bolt openings 74 formed therein which are aligned with the lower bolt openings 66 in splice plate 62. Splice plate 72 also has a plurality of upper bolt openings 76 formed therein which are aligned with the upper bolt openings 68 formed in splice plate 62.

Lower bolts 78 having washers 80 thereon extend through the bolt openings 74 in splice plate 72, through the openings 24 in pole 12, through bolt openings 66 in splice plate 62 for threadable reception by the nuts 54. Similarly, upper bolts 82 having washers 84 thereon extend through upper bolt openings 76 in splice plate 72, through the bolt openings 26 in pole 12, through bolt openings 68 in splice plate 62 for threadable connection to the nuts 58. Splice plates 72 and 62 firmly splice the poles 12 and 14 together when the bolts 78 and 82 are tightened onto the nuts 54 and 58, respectively.

Figure 2:
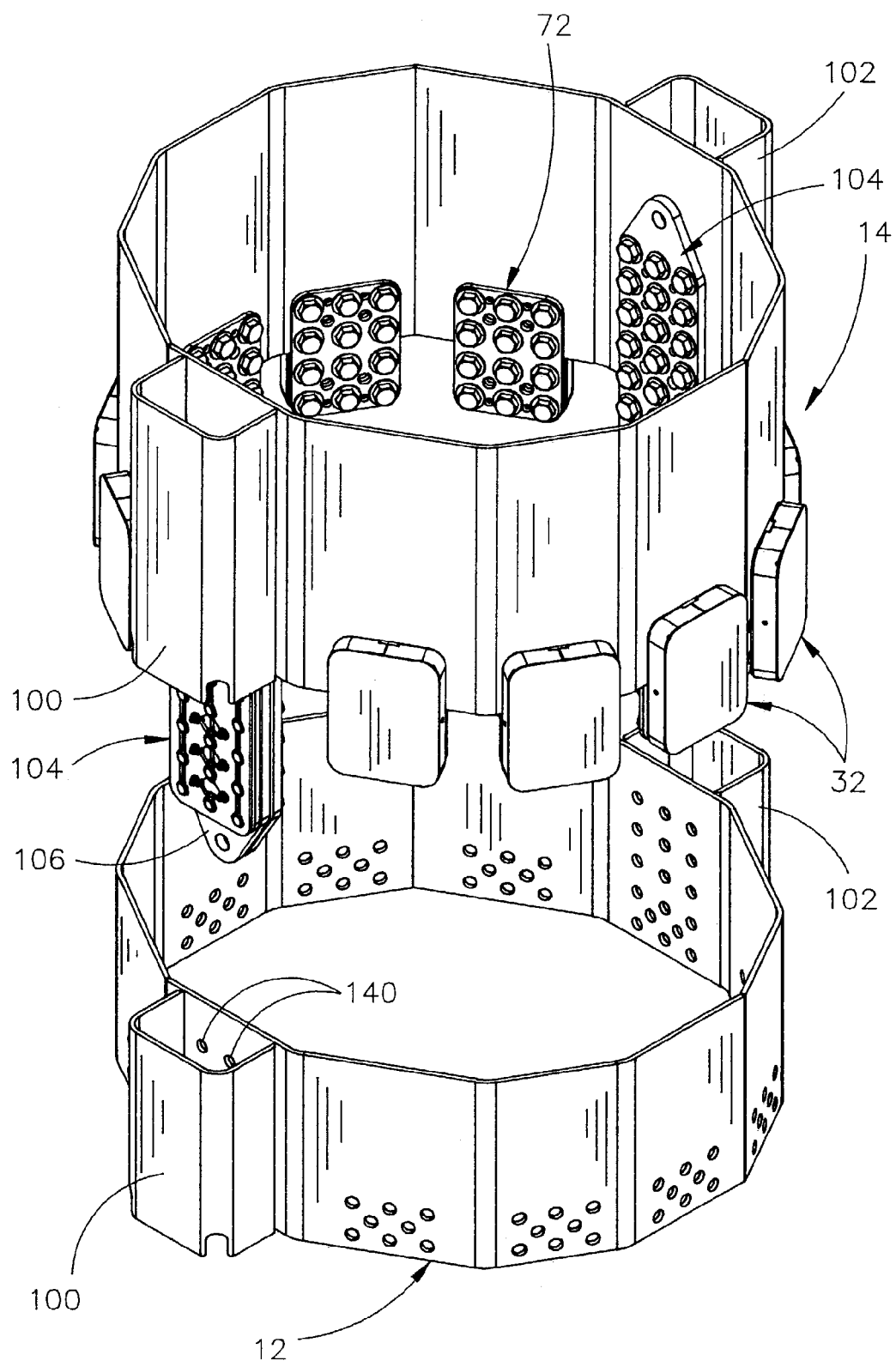
FIG. 2 is a partial perspective view of upper and lower tubular pole members having the two-plate splice connectors of this invention mounted thereon.
Figure 3:
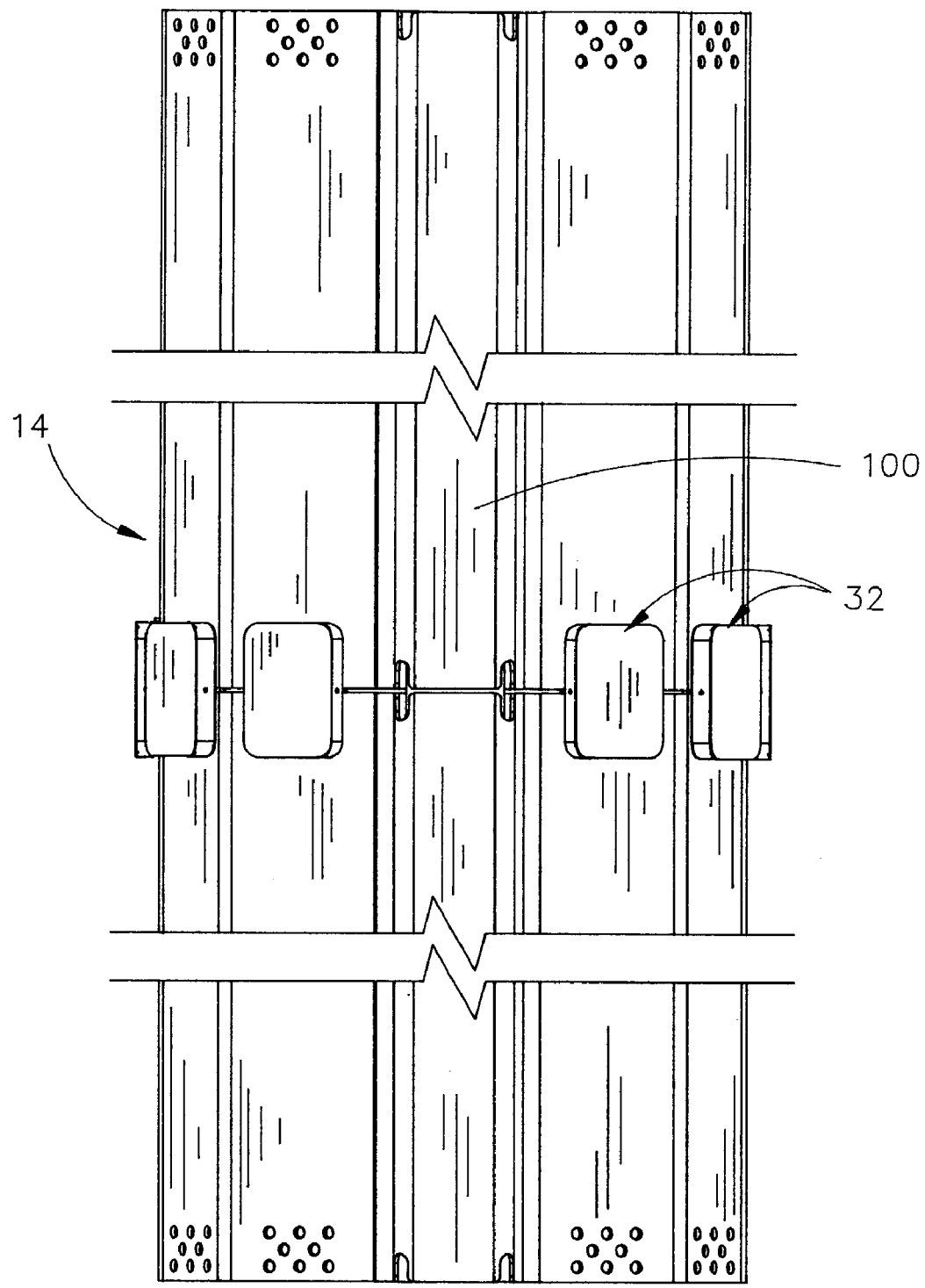
FIG. 3 is a partial side view illustrating a pair of tubular pole members being spliced together with the two-plate splice connection assemblies of this invention.
Figure 4:
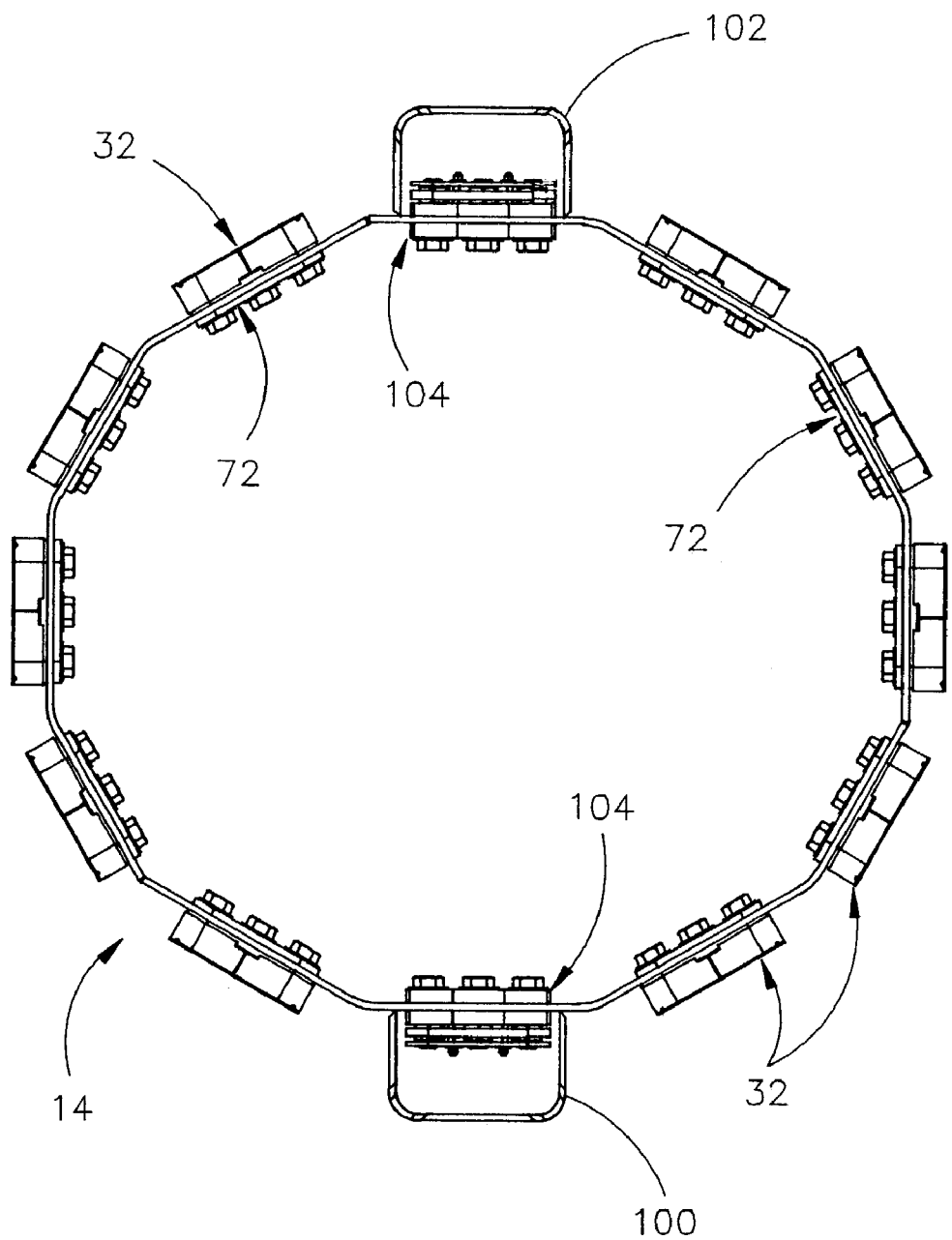
FIG. 4 is a sectional view illustrating the two-plate splice connection assemblies of this invention.

If the pole is configured so as to have a plurality of angular shaft wall portions, as illustrated in FIG. 2, it is preferred that an assembly 32 be used on each of the angular shaft wall portions, as illustrated in FIG. 2. If the pole is tubular, the assemblies 32 would normally have an arcuate cross-sectional configuration so as to conform to the curvature of the shaft walls.

Figure 12:
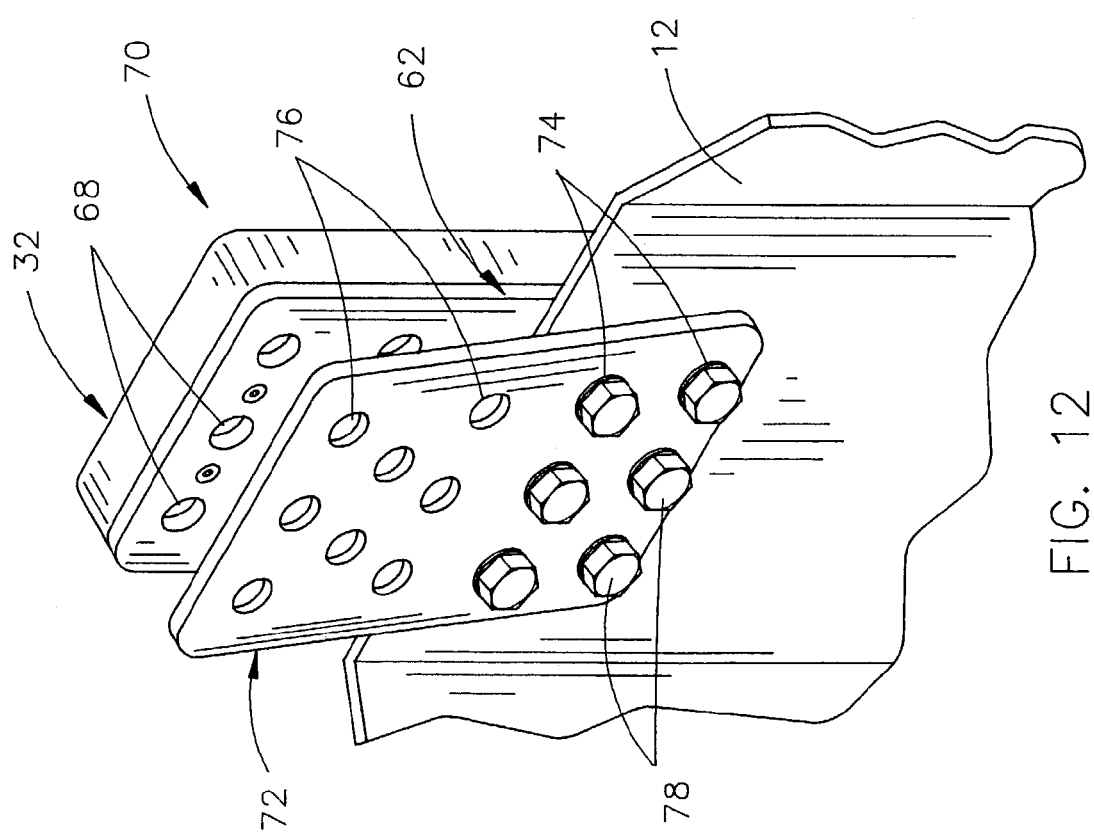
FIG. 12 is a perspective view illustrating the manner in which the first embodiment of the two-plate splice connection is initially installed on a lower tubular pole member.
Figure 14:
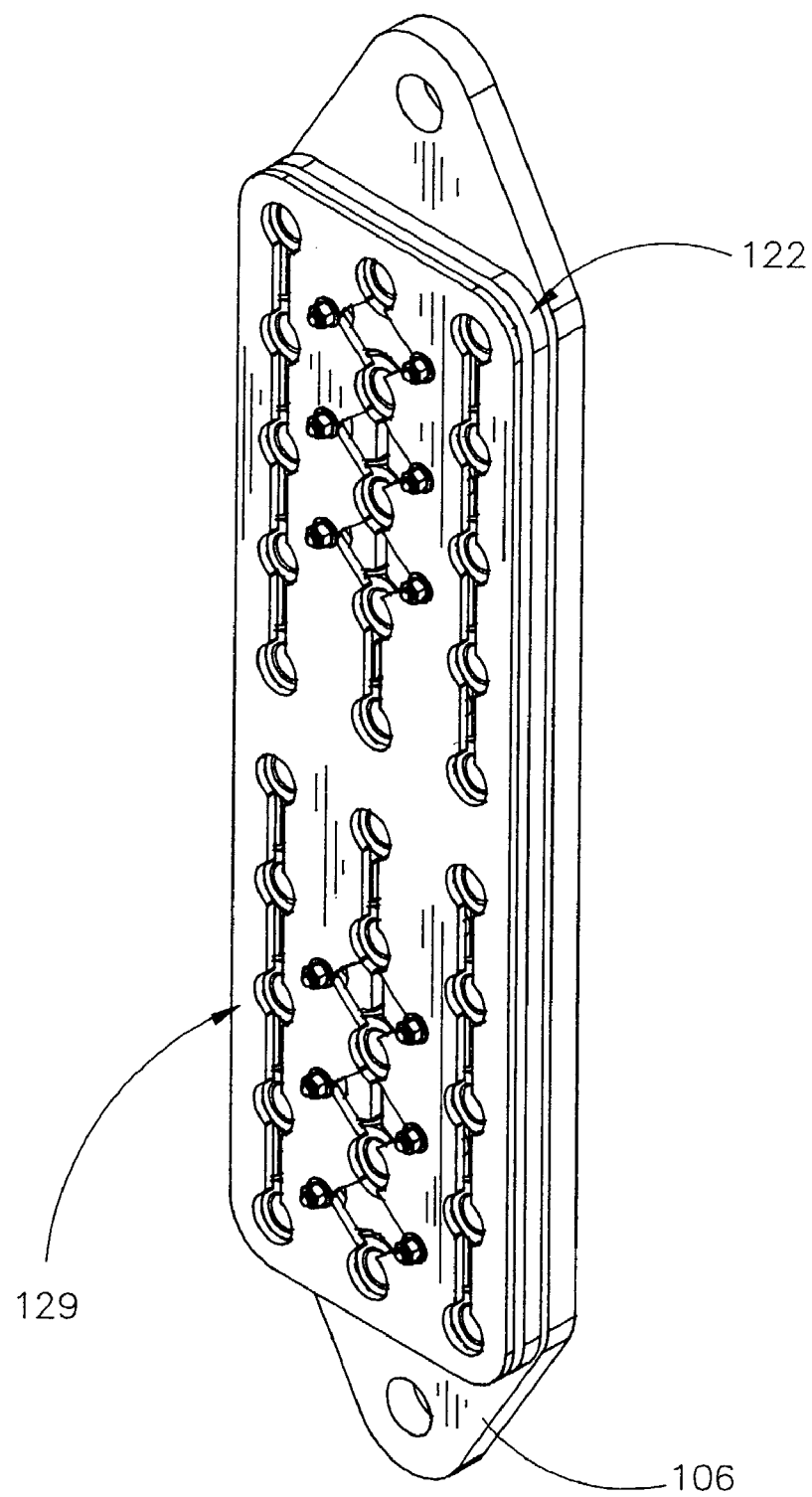
FIG. 14 is a partial perspective view of a modified form of the two-plate splice connection assembly which is used to secure upper and lower rails mounted on upper and lower tubular pole members.
Figure 15:
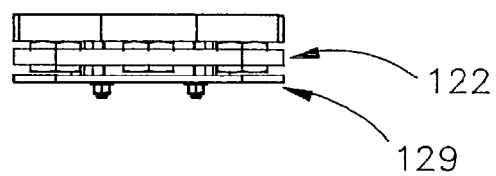
FIG. 15 is a top view of the splice plate of FIG. 14.
Figure 16:
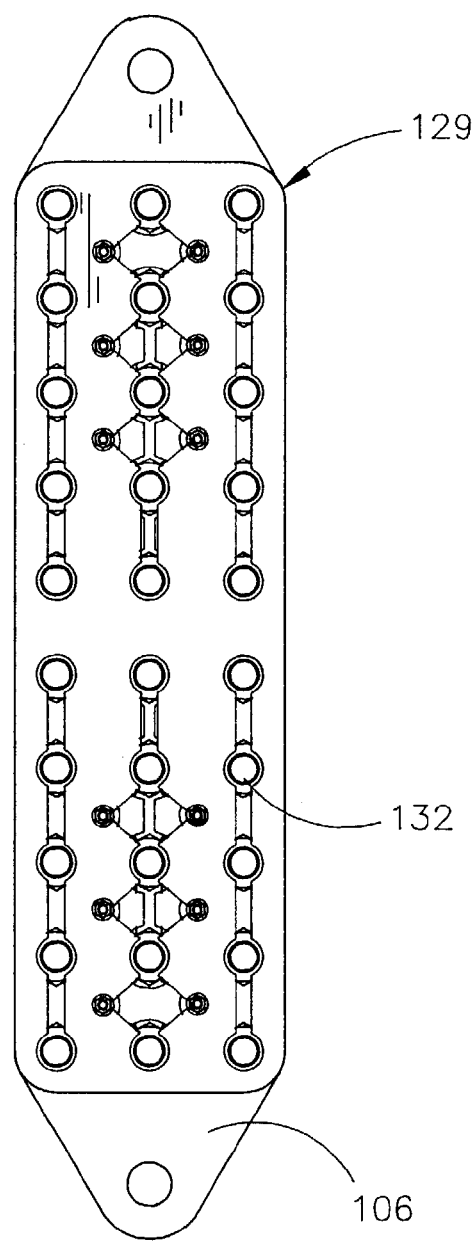
FIG. 16 is a front view of the structure of FIG. 14.
Figure 17:
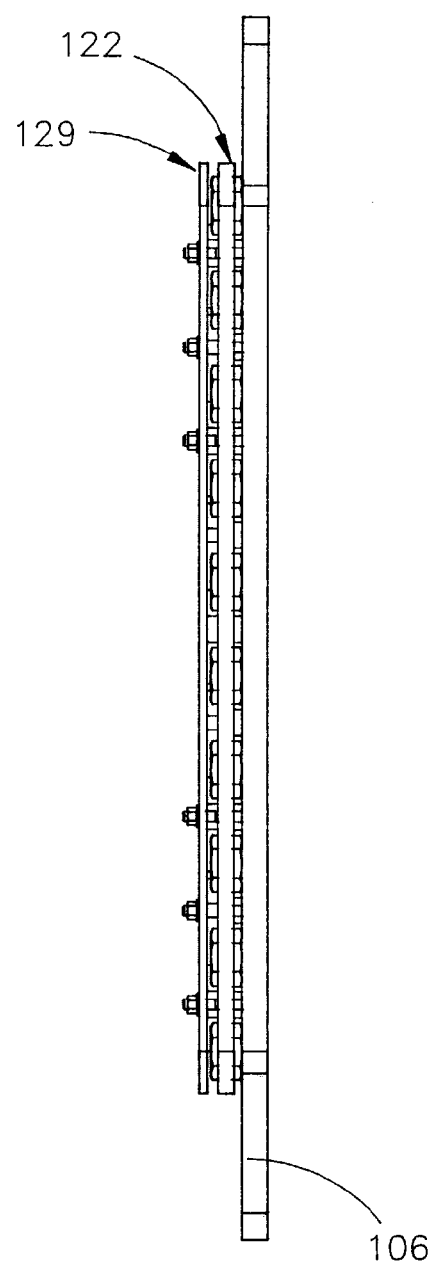
FIG. 17 is a side view of the structure of FIG. 14.
Figure 18:
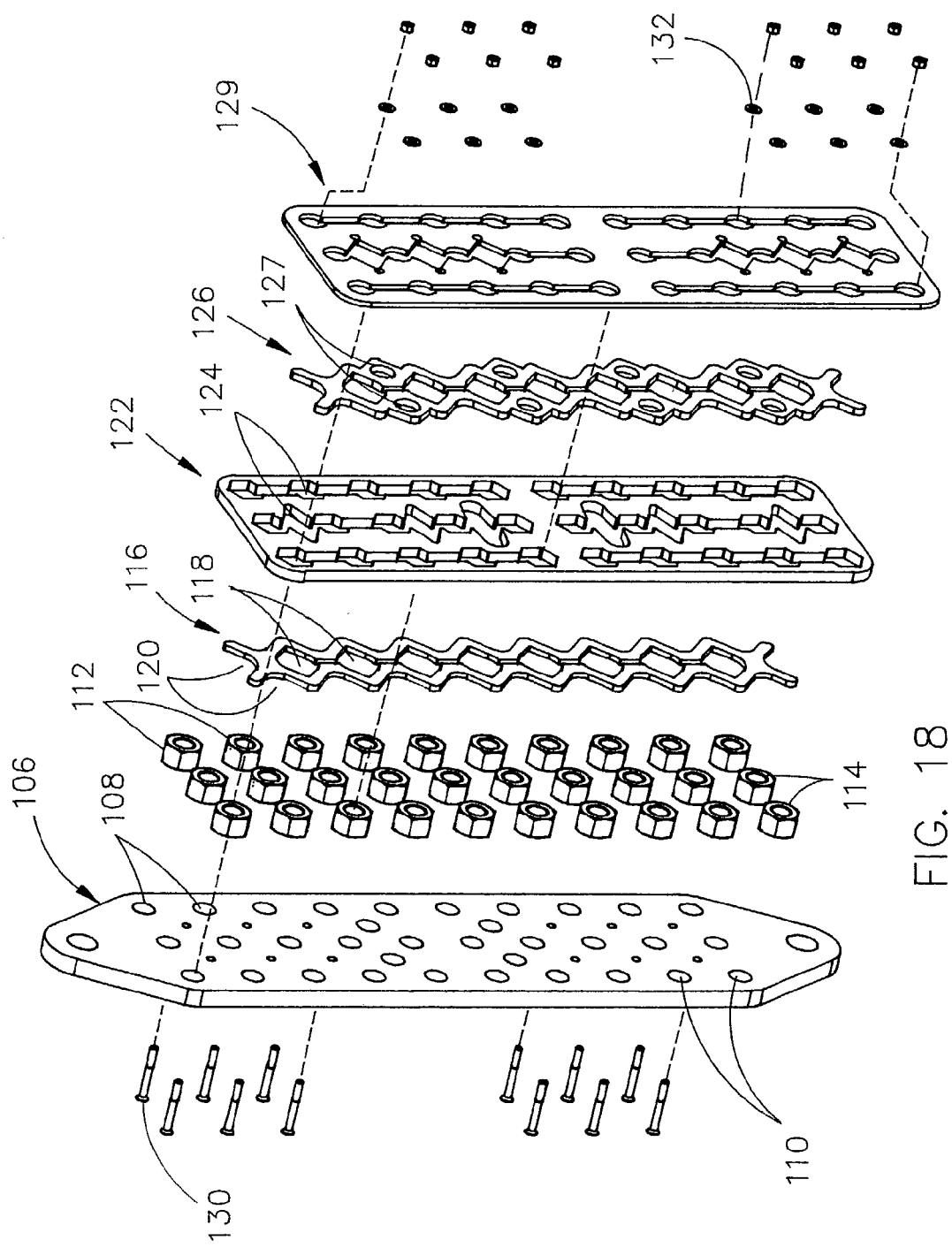
FIG. 18 is an exploded perspective view of the structure of FIG. 14.
Figure 19:
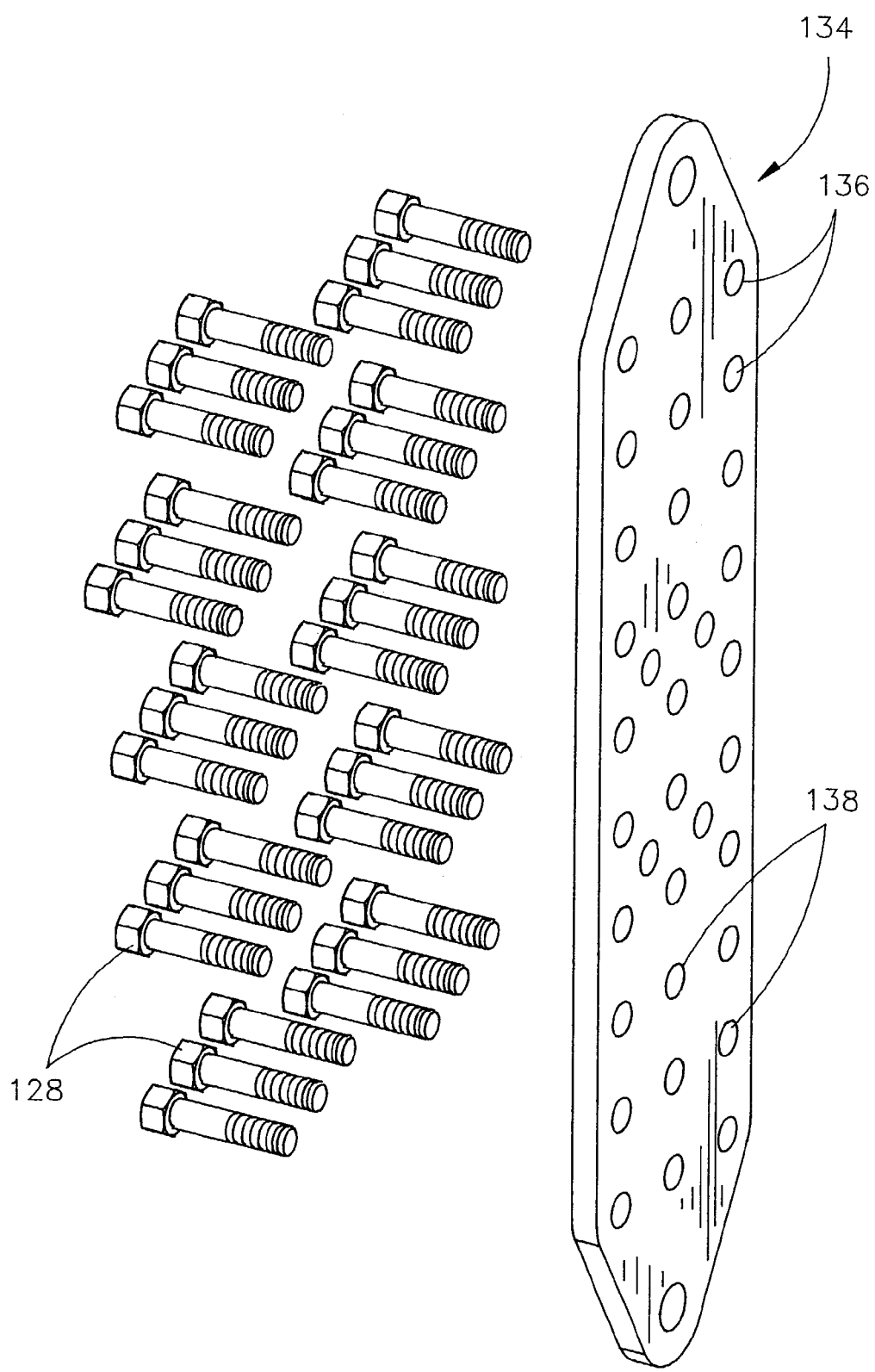
FIG. 19 is a perspective view of an inner plate which is associated with the structure of FIG. 14.

Assuming that the lower tubular pole member 12 is in its installed or erected position and it is desired to mount the upper pole member 14 thereon, a plurality of the assemblies 32 are loosely secured to the lower tubular pole member 12, as illustrated in FIG. 12, so that a plurality of the bolts 78 extend through splice plate 72 and are threadably received by the lower nuts 58 within cover 34. The nuts 54 may move somewhat in their openings 52 in the nut plate 50 to aid in attaching the bolts 78 thereto. A loose connection of the bolts 78 with the nuts 54 permits the upper tubular pole member 14 to be inserted downwardly between the splice plates 72 and 62. The upper bolts 82 are then extended through the openings 74 in splice plate 72, through the openings 26 in pole member 14, through openings 68 in splice plate 62 and threadably received by the nuts 58.

The bolts 78 and 82 may then be tightened with respect to the nuts 54 and 58, respectively, without the need for a person to be on the outside of the pole to hold the nuts 54 and 58 from being rotated as the bolts 78 and 82 are rotated. The cover 34 is primarily for aesthetic purposes but also shields the components thereof from the elements. The keeper plate 48 prevents the nuts 54 and 58 from moving outwardly as the bolts 78 and 82 engage the same. Should the nuts 54 and 58 become loose during the life of the pole, a person may enter the interior of the pole and tighten the bolts 82 and 78. Although it has been described that the assembly 70 is on the outer side of the pole, the components could be reversed so that the bolts extend inwardly through the pole rather than outwardly through the pole.

In those situations where the pole members 12 and 14 each have a pair of rails 100 and 102 mounted on the outer side thereof such as is necessary for supporting a platform or the like thereon as disclosed in U.S. Pat. No. 6,505,785, a two-plate splice connection is provided for connecting the rail members on the upper and lower pole members with that two-plate splice connection being referred to generally by the reference numeral 104. Assembly 104 includes an outer splice plate 106 having a plurality of upper bolt openings 108 formed therein and a plurality of lower bolt openings 110 formed therein. Upper nuts 112 and lower nuts 114 are positioned adjacent splice plate 106 and are aligned with the openings 108 and 110 and held in alignment by the keeper plate 116. Keeper 116 includes openings 118 which receive certain of the nuts 112 and 114 and includes cut out portions 120 which receive the nuts 112 and 114. Nut plate 122 is positioned adjacent keeper plate 116 and has a plurality of nut openings 124 which receive the nuts 112 and 114 therein. Keeper plate 126 is positioned adjacent nut plate 122 and has openings 127 formed therein which receive bolts 128 extending therethrough for connection to the nuts 112 and 114. Plate 129 is positioned adjacent keeper plate 126 with the entire assembly being connected together by means of the cap screws 130 and nuts 132. Plate 129 maintains the nuts 112 and 114 within the assembly while the nut plate 122 prevents the nuts 112 and 114 from being rotated as the bolts 128 are threadably inserted into the nuts 112 and 114.

The numeral 134 refers to a second splice plate which is positioned inwardly of plate 129 and which has the bolts 128 extending therethrough for connection to the nuts 112 and 114.

The assembly 104, less the splice plate 134, is positioned within the interior of the rail 100, as illustrated in FIG. 2, with splice plate 134 being positioned in the interior of the pole member and being aligned with the bolt openings in plate 129. Bolts 128 are extended through the upper openings 136 in splice plate 134, through openings in the pole member 14, through the upper openings in plate 129, for threadable connection to the nuts 112 in nut plate 122. When the upper pole member 14 is lowered onto the lower pole member 12, splice plate 106 is positioned within the rail 100 and the splice plate 134 is positioned at the interior of the lower pole member 12. Bolts 128 are then extended through the lower openings 138 in splice plate 134, through the openings 140 in lower pole member 12, through plate 129, keeper plate 126 and into the nuts 114 maintained in position by the nut plate 122. The bolts 128 are then tightened so that the rails are securely spliced together.

Thus it can be seen that the invention accomplishes at least all of its stated objectives.

I claim:

1. A two-plate splice connection assembly for connecting the lower end of an upper tubular pole member to the upper end of a lower tubular pole member, the pole members having inner and outer surfaces, comprising:

the upper end of the lower pole member having a plurality of bolt openings formed therein, the lower end of the upper pole member having a plurality of bolt openings formed therein;

a substantially vertically disposed cover plate having an interior compartment and inner and outer ends;

a keeper plate positioned within said interior compartment of said cover plate inwardly of said outer end thereof;

a nut plate positioned within said interior compartment of said cover plate inwardly of said keeper plate;

said nut plate having a plurality of spaced-apart lower nut openings formed therein and a plurality of spaced-apart upper nut openings formed therein, each of which has nuts received therein;

said nut openings preventing the nuts therein from rotating;

a first splice plate mounted on said inner end of said cover plate;

said first splice plate having a plurality of spaced-apart lower bolt openings formed therein which are aligned with said lower nut openings in said nut plate and a plurality of spaced-apart upper bolt openings formed therein which are aligned with said upper nut openings in said nut plate;

said first splice plate being positioned adjacent said outer surface of said lower pole member so that said lower bolt openings in said first splice plate are aligned with bolt openings in said upper end of said lower pole member;

a second splice plate positioned in the interior of the lower pole member adjacent the inner surface thereof;

said second splice plate having a plurality of spaced-apart lower bolt openings formed therein which are aligned with said lower bolt openings in said first splice plate and having a plurality of spaced-apart upper bolt openings formed therein which are aligned with said upper bolt openings in said first splice plate;

a plurality of lower bolts extending through said lower bolt openings in said second splice plate, through bolt openings in said lower pole member and which are threadably connected to said lower nuts in said nut plate;

and a plurality of upper bolts extending through said upper bolt openings in said second splice plate, through bolt openings in said upper pole member and which are threadably connected to said upper nuts in said nut plate.

2. The assembly of claim 1 wherein said first splice plate is attached to said cover plate by threaded connectors.

3. The assembly of claim 1 wherein a plurality of spacers are positioned between said keeper plate and said nut plate.

4. The assembly of claim 1 wherein a plurality of spacers are positioned between said nut plate and said first splice plate.

5. The assembly of claim 4 wherein said spacers are ring-shaped and sized so that said bolts and nuts may be received therein.

6. The assembly of claim 1 wherein a plurality of the two-plate splice connection assemblies connect the lower end of the upper pole member to the upper end of the lower pole member.

7. The assembly of claim 1 wherein said nut openings in said nut plate are sized to permit said nuts to float therein while preventing rotation thereof.

8. The assembly of claim 1 wherein said keeper plate prevents said nuts from moving outwardly with respect to said nut plate.

9. The assembly of claim 1 wherein said first splice plate prevents said nuts from moving inwardly with respect to said nut plate.

10. A two-plate splice connection assembly for connecting the lower end of an upper tubular pole member to the upper end of a lower tubular pole member, the pole members having inner and outer surfaces, comprising:

the upper end of the lower pole member having a plurality of bolt openings formed therein, the lower end of the upper pole member having a plurality of bolt openings formed therein;

a substantially vertically disposed cover plate having inner and outer ends;

a nut plate operatively secured to said cover plate inwardly thereof;

said nut plate having a plurality of spaced-apart lower nut openings formed therein and a plurality of spaced-apart upper nut openings formed therein, each of which has nuts received therein;

said nut openings preventing the nuts therein from rotating;

a first splice plate operatively connected to said cover plate;

said first splice plate having a plurality of spaced-apart lower bolt openings formed therein which are aligned with said lower nut openings in said nut plate and a plurality of spaced-apart upper bolt openings formed therein which are aligned with said upper nut openings in said nut plate;

said first splice plate being positioned adjacent said outer surface of said lower pole member so that said lower bolt openings in said first splice plate are aligned with bolt openings in said upper end of said lower pole member;

a second splice plate positioned in the interior of the lower pole member adjacent the inner surface thereof;

said second splice plate having a plurality of spaced-apart lower bolt openings formed therein which are aligned with said lower bolt openings in said first splice plate and having a plurality of spaced-apart upper bolt openings formed therein which are aligned with said upper bolt openings in said first splice plate;

a plurality of lower bolts extending through said lower bolt openings in said second splice plate, through bolt openings in said lower pole member and which are threadably connected to said lower nuts in said nut plate;

and a plurality of upper bolts extending through said upper bolt openings in said second splice plate, through bolt openings in said upper pole member and which are threadably connected to said upper nuts in said nut plate.

11. The assembly of claim 10 wherein said first splice plate is attached to said cover plate by threaded connectors.

12. The assembly of claim 10 wherein a plurality of the two-plate splice connection assemblies connect the lower end of the upper pole member to the upper end of the lower pole member.

13. The assembly of claim 10 wherein said nut openings in said nut plate are sized to permit said nuts to float therein while preventing rotation thereof.

14. The assembly of claim 10 wherein a keeper plate is operatively connected to said cover plate which is positioned between said cover plate and said nut plate, said keeper plate preventing said nuts from moving outwardly with respect to said nut plate.

15. A two-plate splice connection assembly for connecting the lower end of an upper tubular pole member to the upper end of a lower tubular pole member, the pole members having inner and outer surfaces, comprising:

the upper end of the lower pole member having a plurality of bolt openings formed therein, the lower end of the upper pole member having a plurality of bolt openings formed therein;

a substantially vertically disposed outer splice plate having inner and outer ends;

a nut plate positioned inwardly of said outer splice plate which is operatively secured to said outer splice plate;

said nut plate having a plurality of spaced-apart lower nut openings formed therein and a plurality of spaced-apart upper nut openings formed therein, each of which has nuts received therein;

said nut openings preventing the nuts therein from rotating;

a keeper plate operatively secured to said first splice plate inwardly of said first splice plate;

said outer splice plate having a plurality of spaced-apart lower bolt openings formed therein and a plurality of spaced-apart upper bolt openings formed therein;

said keeper plate having a plurality of spaced-apart lower bolt openings formed therein which are aligned with said lower nut openings in said nut plate and a plurality of spaced-apart upper bolt openings formed therein which are aligned with said upper nut openings in said nut plate;

said first splice plate being positioned adjacent said outer surface of said lower pole member so that said lower bolt openings in said first splice plate are aligned with bolt openings in said upper end of said lower pole member;

a second splice plate positioned in the interior of the lower pole member adjacent the inner surface thereof;

said second splice plate having a plurality of spaced-apart lower bolt openings formed therein which are aligned with said lower bolt openings in said first splice plate and having a plurality of spaced-apart upper bolt openings formed therein which are aligned with said upper bolt openings in said first splice plate;

a plurality of lower bolts extending through said lower bolt openings in said second splice plate, through bolt openings in said lower pole member and which are threadably connected to said lower nuts in said nut plate;

and a plurality of upper bolts extending through said upper bolt openings in said second splice plate, through bolt openings in said upper pole member and which are threadably connected to said upper nuts in said nut plate.

* * * * *